US008260690B2

(12) United States Patent
Eivaz et al.

(10) Patent No.: US 8,260,690 B2
(45) Date of Patent: Sep. 4, 2012

(54) SYSTEM AND METHOD FOR CAPTURING TEST SUBJECT FEEDBACK (75) Inventors: Ramin Eivaz, Charlotte, NC (US); Matthew K. Gruttadauria, Sandwich, MA (US); Mark Edwards, Milton Keynes Village Buckinghamshire (GB)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 248 days.

(21) Appl. No.: 12/375,659

(22) PCT Filed: Nov. 7, 2007

(86) PCT No.: PCT/IB2007/054531
§ 371 (c)(1),
(2), (4) Date: Feb. 2, 2010

(87) PCT Pub. No.: WO2008/056330
PCT Pub. Date: May 15, 2008

(65) Prior Publication Data
US 2010/0299182 A1    Nov. 25, 2010

(51) Int. Cl.
*G06Q 30/00* (2012.01)
(52) U.S. Cl. .............. 705/27.2; 705/7.29; 705/7.32; 705/26.1; 705/27.1
(58) Field of Classification Search ............. 705/7.29, 705/7.32, 26.1–27.2
See application file for complete search history.

(56) References Cited

U.S. PATENT DOCUMENTS

| | | | | | |
|---|---|---|---|---|---|
| 5,320,538 | A | * | 6/1994 | Baum | 434/307 R |
| 5,329,276 | A | * | 7/1994 | Hirabayashi | 340/870.31 |
| 5,381,158 | A | * | 1/1995 | Takahara et al. | 345/156 |
| 5,590,062 | A | * | 12/1996 | Nagamitsu et al. | 703/6 |
| 5,758,849 | A | * | 6/1998 | Bui et al. | 248/125.1 |
| 6,026,376 | A | * | 2/2000 | Kenney | 705/26.61 |
| 6,381,583 | B1 | * | 4/2002 | Kenney | 705/26.8 |
| 6,437,777 | B1 | * | 8/2002 | Kamachi et al. | 345/419 |
| 6,563,489 | B1 | * | 5/2003 | Latypov et al. | 345/164 |
| 6,822,638 | B2 | * | 11/2004 | Dobies et al. | 345/161 |
| 2001/0008396 | A1 | * | 7/2001 | Komata | 345/156 |

(Continued)

OTHER PUBLICATIONS

"Virtual Technology: Bringing the World Into the Special Education Classroom". Therese M Smedley, Kyle Higgins. Intervention in School and Clinic. Austin: Nov. 2005. vol. 41, Iss. 2; p. 114, 6 pgs.*

(Continued)

*Primary Examiner* — William Allen
(74) *Attorney, Agent, or Firm* — Armstrong Teasdale LLP (57) ABSTRACT Embodiments of the invention include an apparatus used to present a participant with a virtual reality simulation of a shopping environment. For example, the system of the present invention may be used to simulate the environment of a retail store where consumer goods are purchased. In one embodiment, a virtual reality station may include a number of functional systems that collectively provide an apparatus for capturing test subject feedback. The systems may include a participant interface and/or simulation control system, a support structure interconnection system, and a computer system configured to generate and present an immersive virtual reality environment on one or more display screens connected to the support structure.

20 Claims, 7 Drawing Sheets

U.S. PATENT DOCUMENTS

| | | | |
|---|---|---|---|
| 2003/0005439 A1* | 1/2003 | Rovira | 725/37 |
| 2006/0066570 A1* | 3/2006 | Trifilo | 345/157 |
| 2007/0118437 A1* | 5/2007 | Perrault | 705/26 |
| 2007/0130006 A1* | 6/2007 | Dahl | 705/14 |
| 2007/0192203 A1* | 8/2007 | Di Stefano | 705/26 |
| 2008/0065468 A1* | 3/2008 | Berg et al. | 705/10 |
| 2008/0189173 A1* | 8/2008 | Bakar et al. | 705/14 |
| 2010/0185514 A1* | 7/2010 | Glazer et al. | 705/14.51 |

OTHER PUBLICATIONS

International Preliminary Report on Patentability for PCT/IB2007/054531, dated May 12, 2009, 8 pages.
International Search Report and Written Opinion for PCT/IB2007/054531, dated Mar. 17, 2008, 12 pages.

* cited by examiner

SYSTEM AND METHOD FOR CAPTURING TEST SUBJECT FEEDBACK

BACKGROUND OF THE INVENTION

1. Field of the Invention

Embodiments of the present invention generally relate to a system and method for capturing feedback generated from a virtual reality simulation.

2. Description of the Related Art

The manufacture, marketing, and sales of consumer products is highly competitive, and consumer product manufacturers, wholesalers and retailers, are interested in obtaining feedback from the people who select, purchase and use their products. Feedback may be obtained using research methodologies and technologies that support those methodologies. Supporting technologies include computer hardware and software tools that can be used to simulate the environments in which people select products, purchase products and use products. The essential endeavor of this type of consumer research is to attempt to understand what influences a consumer's purchasing decision, i.e., to answer the question "why?" a consumer purchases one product over another.

While software tools are capable of generating very realistic appearing environments for conducting market research, the environments are limited when presented on two-dimensional computer monitors. The limitations of the simulated environment can undermine the quality of the research results.

SUMMARY OF THE INVENTION

Embodiments of the invention include an apparatus used to present a participant with a virtual reality simulation of a shopping environment. One embodiment of the invention provides an apparatus for capturing test subject feedback from a virtual reality simulation of a shopping environment. The apparatus may generally include one or more display screens configured to provide a panoramic view of the simulated shopping environment, a participant interface and control system configured to mimic at least a portion of a shopping cart, and a computer system configured to generate and present the virtual reality simulation to a simulation participant. The apparatus may further include one or more participant monitoring systems configured to monitor one or more physical responses of the simulation participant interacting with the virtual reality simulation and a support structure and connection system connecting the one or more display screens, the participant interface and control system, the computer system, and the one or more participant monitoring systems.

Another embodiment of the invention includes a system having a computing device, a memory storing a virtual reality program, and a virtual reality display platform. The virtual reality program may generally be configured to generate a virtual shopping environment corresponding to a real-world shopping environment. The virtual reality display platform may generally include one or more display screens configured to present a participant with a panoramic view of the virtual shopping environment, a participant interface and control system configured to mimic at least a portion of a shopping cart, and one or more participant monitoring systems configured to monitor one or more physical responses of a simulation participant interacting with the virtual shopping environment. The virtual reality display platform may generally further include a support structure and connection system connecting the one or more display screens, the participant interface and control system, the computer system, and the one or more participant monitoring systems.

Still another embodiment of the invention includes a method for capturing test subject feedback from a virtual reality simulation of a shopping environment. The method may generally include generating a virtual reality simulation of a shopping environment to present to a simulation participant and presenting the virtual reality simulation to the simulation participant on a virtual reality presentation platform. The virtual reality display platform may generally include one or more display screens configured to present a participant with a panoramic view of the virtual shopping environment and also include a participant interface and control system configured to mimic at least a portion of a shopping cart. The virtual reality display platform may also include one or more participant monitoring systems configured to monitor one or more physical responses of a simulation participant interacting with the virtual shopping environment and a support structure and connection system connecting the one or more display screens, the participant interface and control system, the computer system, and the one or more participant monitoring systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention include an apparatus used to present a participant with a virtual reality simulation of a shopping environment. For example, the system of the present invention may be used to simulate the environment of a retail store where consumer goods are purchased. In one embodiment, a virtual reality station may include a number of functional systems that collectively provide an apparatus for capturing test subject feedback. The systems may include a participant interface and/or simulation control system, a support structure interconnection system, and a computer system configured to generate and present an immersive virtual reality environment on one or more display screens connected to the support structure. The virtual shopping environment may be configured to be responsive to user interaction. For example, the participant interface may allow the participant to navigate through the virtual shopping environment by using a joystick device fashioned to have the size, shape and appearance of a shopping cart. The systems may also include one or more participant monitoring systems used to capture feedback regarding the participants' interaction with the simulation.

Such feedback may be used by supply chain entities (e.g., consumer product manufacturers, wholesalers and retailers) to conduct a variety of market research activities. Desirable research may include obtaining test subject feedback regarding different store appearances and different appearances of products within the stores. Examples of modifications to the retail store environment that may be tested include product package colors, shape and other aspects of the appearance of product packages; the layout, spacing, product arrangement and available product assortment of shelves/displays; and the dimensions, location and appearance of aisles within the retail store environment. Further, the virtual shopping environment may be configured to include in-store point of store point of purchase materials such as store signage, in-store video displays, shelf tags, floor graphics, etc. The test subjects may be asked a series of questions or asked to provide input in order to make a comparison between different retail store environments and to draw conclusions about the impact of the different retail store environments on customer behavior. A given test consumer may be provided with a virtual experience of both store environments.

Embodiments of the invention may include other components to improve the simulation of a retail store or other environment. For example, the system may include a device that generates smells and/or sounds associated with a given environment. Accordingly, the virtual reality station of the present invention allows elements of a shopping environment to be simulated more realistically, thus reducing the "degrees of separation" between a given real-world shopping environment and a virtual reality simulation corresponding to that environment. The result is that a higher quality of research may be performed to capture feedback from people who select, purchase and use products. Further, the virtual reality station may be configured to be highly portable, allowing the station to be moved conveniently from one location to another. Thus, the virtual reality station may be transported to a location for use by a group of study participants. This allows market research to be conducted for very dissimilar demographic groups across the globe, without requiring large groups of individuals to travel a central location. Thus, not only may the quality of research be significantly improved, research costs may be significantly reduced as well.

The following description references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD-ROM or DVD-ROM drive); (ii) writable storage media on which alterable information is stored (e.g., floppy disks within a diskette drive, hard-disk drives, or flash memory devices). Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
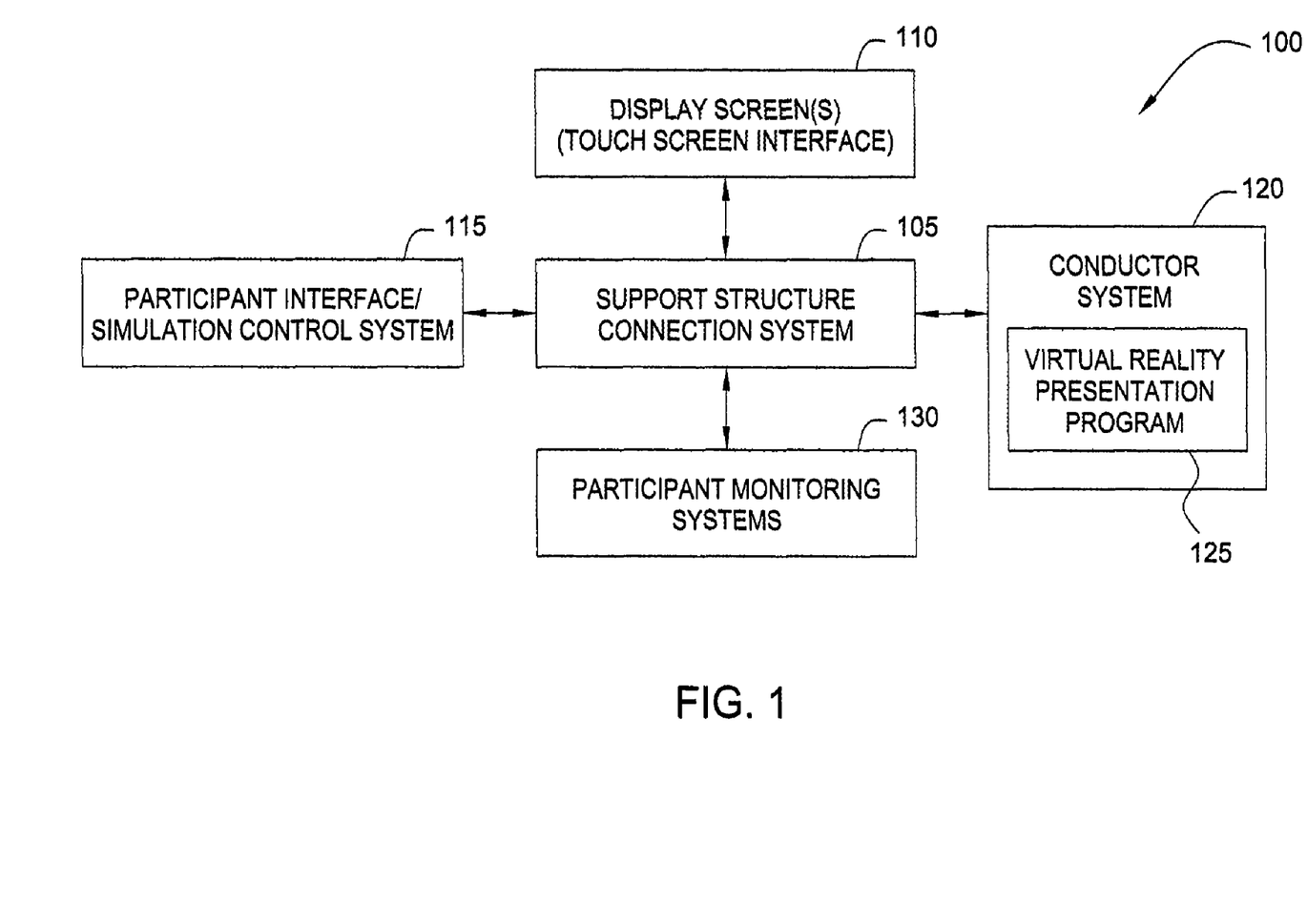
FIG. 1 is a block diagram illustrating a group of interconnected functional systems provided by a system for capturing test subject feedback, according to one embodiment of the invention.

FIG. 1 is a block diagram illustrating a group of interconnected functional systems provided by a system 100 for capturing test subject feedback, according to one embodiment of the invention. As shown, the functional systems include a support structure and connection system 105, a set of display screens 110, a participant interface and/or simulation control system 115, a computer system 120, and one or more participant monitoring systems 130.

Support structure and connection system 105 may provide a support structure such as a stand or a frame to which other components of the system may be attached. For example, support structure and connection system 105 may include the appropriate attachment points used to connect multiple display screens 110 to provide a simulation participant with a panoramic view of a simulated shopping environment. In one embodiment, the height of the display screens 110 may be adjusted on support structure 105 so that the content of the display screens 110 is at an appropriate eye level for a given research participant. For purposes of keeping the system lightweight (and therefore more readily portable) the display screens 110 may include one or more plasma, LCD, or other flat-panel display systems.

Additionally, display screens 110 may also include a touch screen interface configured to allow the research participant to interact with the simulated shopping environment, for example, to select goods/products for purchase or for requesting the presentation of additional information (e.g., pricing, ingredients, promotional information, detailed views, etc.). In one embodiment, the simulated retail environment may be configured to present the goods as they might appear on the shelves/displays of a real store. The research participant may be presented with different versions of the goods' appearance on the simulated shelves/displays. A protocol may be established to determine how touching an object affects its status. For example, one tap on the object may select it and provide a close-up view, and a second tap may select it for purchase, while two rapid taps may represent a "cancel" command. Alternatively, a voice activated interface, keypad interface, or other known input means may allow the research participant to provide input used to control the course of a simulation.

Participant interface and/or simulation control system 115 may allow research participants to interact with a simulated shopping environment. When used to simulate a retail store environment, for example, the system may include a shopping-cart handle attached to a joystick mechanism. The joystick mechanism allows a research participant to control the movement of a virtual shopping cart through the simulated retail store. For example, pushing forward on the joystick handle may cause the joystick mechanism to tilt forward. In response, the display screens present the appearance of moving forward within the virtual shopping environment. In one aspect, the shopping-cart handle and joystick mechanism may be attached to the support structure 105 at a position representing the typical height of a shopping cart.

Additionally, the joystick mechanism may be configured to allow side-to-side motion and/or forward/back pivotal motion about an axis. Generally, the handle itself remains horizontal in a plane parallel to the floor, but can be translated in that plane, similar to the translation of a handle of an actual shopping cart used during shopping in a retail store environment. A pressure sensing mechanism may also be configured to detect forces applied by the research participant to push the handle forward, pull the handle backwards or direct the handle to either side. In one embodiment, the system 100 also includes a treadmill system that the research participant walks on while gripping the handle. In this way, the research participant can walk in place while appearing to navigate three-dimensional space in a virtual reality environment.

Illustratively, system 100 also includes a computer system 120 executing a virtual reality presentation program 125. Computer system 120 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Additionally, those skilled in the art will recognize that the illustration of computer 120 is simplified to highlight aspects of the present invention and that computing systems and networks typically include a variety of components not shown in FIG. 1.

Presentation program 125 may be a software application configured to generate a virtual environment presented to a research participant on display screens 110. For example, presentation program 125 may be configured to detect the application of force to handle bar and joystick mechanism, and in response, to generate the imagery shown to the research participant (and optionally to others as well) on the display screens 110. The imagery may create the appearance of movements through the simulated shopping environment. That is, force applied the handle may detected by the simulation control system 115 and may be communicated to computer system 120 and presentation program 125. Additionally, participant interface/simulation control system 115 may include an interface used to control what view of the simulated shopping environment is shown to the research participant. For example, the handle bar may include a thumb-controlled joystick allowing the research participant to pan the view of the simulated shopping-environment up, down, or side to side, simulating a full range of motion. Similarly, the thumb controlled joystick could include buttons allowing the research participant to quickly perform some predefined motion, e.g., ducking down or turning to a 90 degree view left or right of the forward position of the cart, i.e., a quick look left or right.

Participant monitoring systems 130 may provide systems used to capture feedback for a given research participant. For example, participant monitoring systems 130 may be configured to simply record a given simulation for later playback. However, participant monitoring systems 130 may also include more sophisticated systems used to monitor behavioral or physical aspects of a research participant interacting with a given simulation of a shopping environment. For example, an eye-tracking device may be associated with the system to provide information about what elements of the simulated environment presented on display screens 110 that are of particular interest to a research participant. Exemplary eye-tracking systems believed to be suitable for use with the system of the present invention include the "EyeTools" system of EyeTools, Inc. (San Francisco, Calif.), a system designed for marketing research that can be used, for example, to track a research participant's responses to Internet web pages. Other systems include One Glance® system of EyeTech Digital Systems (Mesa, Ariz.) and the portable MyTobii eye control system of Tobii Technology (Stockholm, Sweden).

Generally, these (or other) eye tracking systems include one or more small camera systems that track eye motions of the research participant and determine the portions of the display screens 110 that are being viewed at any given moment. The information may be transmitted to computer system 120 and presentation program 125 where it can be associated with information about what is being displayed on the graphic displays. From this, summary information about hot spots or areas and objects of interest for the research participant. For example, an animation sequence may be generated that shows the camera positions and navigation of the participant through the virtual shopping environment, overlaid with tracer lines representing the tracked eye movements of the research participant.

FIGS. 2-6 illustrate two example configurations for the functional systems shown in FIG. 1 and described above. Of course, one of ordinary skill in the art will recognize that these examples may be modified and adapted in a variety of ways for a particular case.

Figure 2:
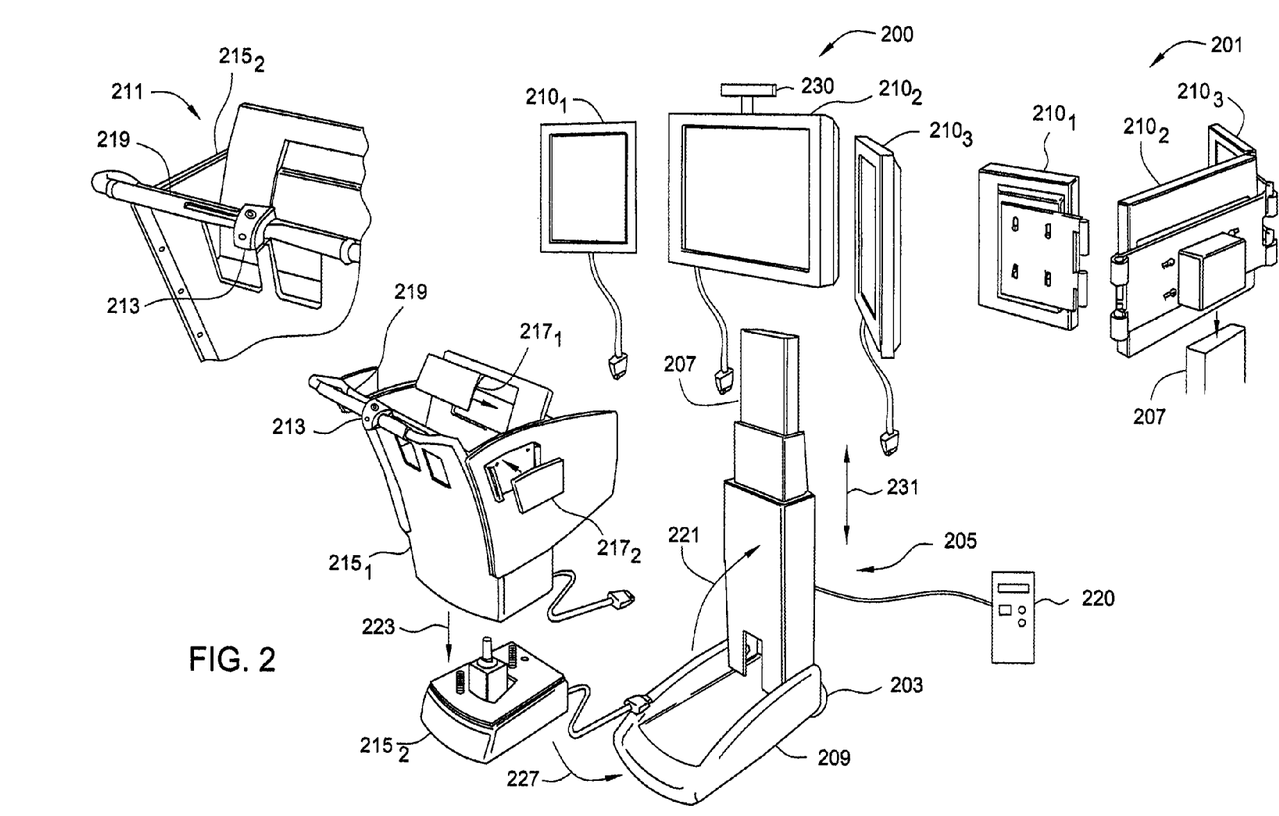
FIG. 2 is an exploded isometric view of an example configuration of an apparatus for capturing test subject feedback, according to one embodiment of the invention.

FIG. 2 is an exploded isometric view 200 of an example configuration of an apparatus for capturing test subject feedback, according to one embodiment of the invention. As shown, isometric view 200 includes a support structure and connection system 205, display screens 210$_{1-3}$, participant interface and control system 215$_1$ and joystick mounting base 215$_2$, a computer system 220, and an eye tracking camera 230.

Illustratively, support structure 205 includes a base 209, an adjustable support member 207, and caster wheels 203. In one embodiment, the base 209 may be folded out for use and up for storage, as represented by arrow 221. While folded up, support structure 205 may be easily moved by tilting support structure 205 to roll on caster wheels 203. While folded down, base 209 may be configured to receive joystick mounting base $215_2$, as represented by an arrow 227. As shown, joystick mounting base $215_2$ includes a connection mechanism for receiving participant interface and control system $215_1$, as represented by an arrow 223. Also as shown, the participant interface and control system $215_1$ includes a bar 219, a thumb joystick 213, and two advertising display panels $217_{1-2}$. The advertising panels 217 may be used to display the name, logo and/or other attributes of a retail store. For example, when used to present a simulation of a real-world store, the simulation may display signage associated with a retailer depicted in the simulation, and the display panels 217 extend this aspect of the virtual shopping environment to that of the physical device. Doing so may allow a product manufacturer to tailor a simulation for presenting a product to a given retail seller. Further, doing so may increase the realism of the simulation for a research participant. It is contemplated that the display panels are removable so that the signage may be varied. In addition, this aspect of the system allows retailers to provide their own display panels for a given simulation.

In one embodiment, the thumb joystick 213 of bar 219 may be used to control the view presented on display screens $210_{1-3}$. As shown in close-in view 211, the bar 219 includes a thumb joystick control device and a button on either side. As described, the thumb joystick 213 may allow the research participant to pan the view of the simulated shopping-environment up, down, or side to side. Similarly, the buttons may allow the research participant to quickly perform some pre-defined motion such as looking left or right.

Display screens $210_{1-3}$ may present a simulation participant with a panoramic view of a simulated shopping environment. As shown in a rear-view 201, display screen $210_2$ may be attached to the top of the adjustable support member 207, and side screens $210_1$ and $210_3$ may be attached thereto by a hinge mechanism. Additionally, adjustable support member 207 may be adjusted in height to accommodate a given research participant, as represented by an arrow 231. Further, by lowering adjustable support member 207 into the lowest possible position, the size of support structure may be reduced for easy portability.

As described, eye tracking system 230 may be used to monitor a participant interacting with a given simulation. In one embodiment, once adjusted for height, the participant may train the eye tracking system 230 to recognize their eye movements. For example, the display screens 210 may display target points viewed by the participant at different positions of the screens. By having the participant view a set of pre-determined target points, the eye tracking system may then accurately determine what location on the display screen 210 the participant happens to be viewing at any given time during a simulation.

Computer system 220 may be connected to support structure 205, and computer system 220 may be running a virtual reality presentation program configured to receive input from participant interface and control system $215_1$, thumb joystick 213, touch screens 210, and the eye tracking device 230.

Figure 3:
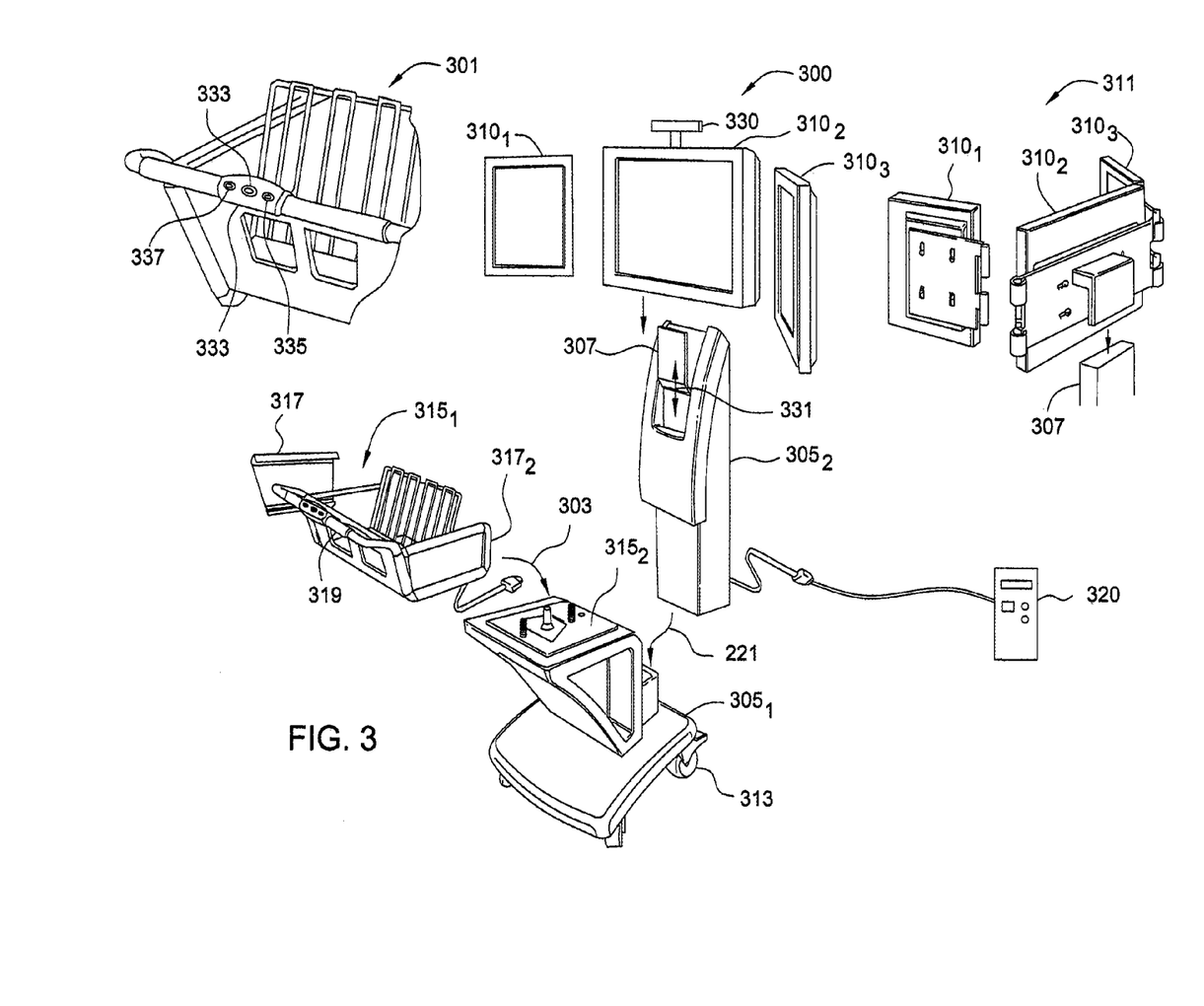
FIG. 3 is an exploded isometric view of another example configuration of an apparatus for capturing test subject feedback, according to one embodiment of the invention.

FIG. 3 is an exploded isometric view 300 of another example configuration of an apparatus for capturing test subject feedback, according to one embodiment of the invention. In the example shown in FIG. 3, a support structure includes a base member $305_1$ and a vertical support member $305_2$. A display screen $310_2$ is configured to attach to a height-adjustable post 307. Display screens $310_1$ and $310_3$ may be attached to display screen $310_2$ to provide simulation participant with a panoramic view of a simulated shopping environment. As shown in rear-view 311 display screens $310_1$ and $310_3$ may be attached thereto by a hinge mechanism. Additionally, the height-adjustable post 307 may be adjusted in height to accommodate a given research participant, as represented by an arrow 331. Further, the height-adjustable post 307 may recede entirely into vertical support member $305_2$ for easy portability.

Display screen $310_2$ also includes an eye tracking system 330. As described, eye tracking system 330 may be used to monitor a participant interacting with a given simulation. Once adjusted for height, the participant may train the eye tracking system 330 to recognize their eye movements. For example, the display screens 310 may display target points viewed by the participant at different positions of the screens. By having the participant view a set of pre-determined target points, the eye tracking system may then accurately determine what location on the display screen 310 the participant happens to be viewing at any given time during a simulation.

Illustratively, base member $305_1$ includes a joystick mounting base $315_2$ used to receive a participant interface and control system $315_1$, as represented by an arrow 303. Like the configuration shown in FIG. 2, participant interface and control system $315_1$ models the appearance of a shopping cart and includes a handle 319 and removable advertising panels $317_{1-2}$. Additionally, as shown in close-in view 301, the handle 319 includes a thumb joystick control device 333 and a button 335, 337 on either side. As described, the thumb joystick 313 may allow the research participant to pan the view of the simulated shopping-environment up, down, or side to side. Similarly, the buttons 335, 337, may allow the research participant to quickly perform some predefined motion such as looking left or right. Base member $305_1$ also includes castor wheels 313 used to provide facilitate transporting the virtual reality station between different locations.

Computer system 320 may be connected to support structure 305 and running a virtual reality presentation program configured to receive input from participant interface and control system $315_1$, thumb joystick 313, touch screens 310, and the eye tracking device 330.

Figure 4:
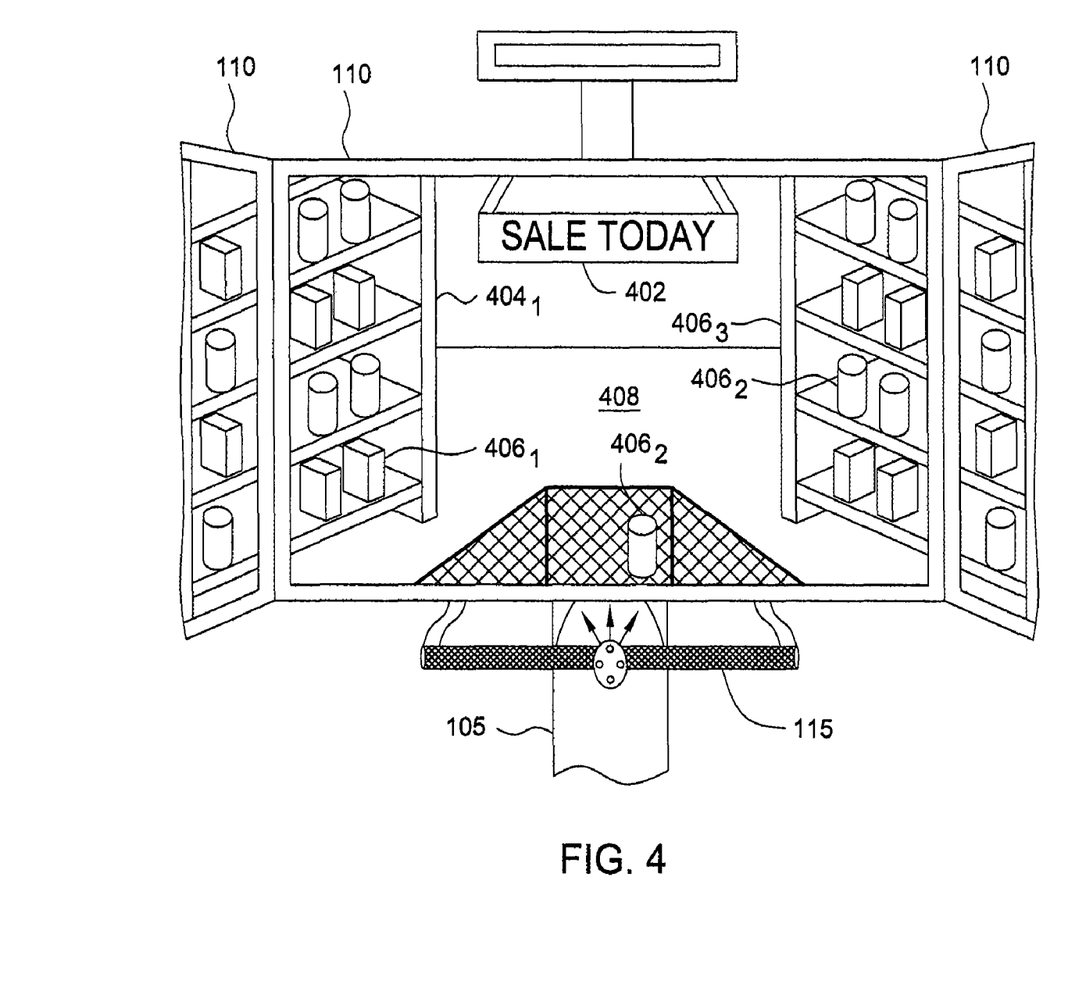
FIG. 4 is a diagram illustrating another view of an apparatus for capturing test subject feedback, according to one embodiment of the invention.

FIG. 4 is a diagram illustrating another view of an apparatus for capturing test subject feedback, according to one embodiment of the invention. As shown, FIG. 4 zooms in on the display screens 110. In this example, display screens 110 display a virtual shopping environment that includes a sign 402, a shelf $404_1$ and a shelf $404_2$, on the shelves are a product $406_1$ and a product $406_3$. Illustratively, virtual shopping cart 410 includes a product $406_2$ selected for purchase by the participant. Aisle floor 408 represents the particular aisle of the virtual shopping environment on which the participant is currently located.

Figure 5:
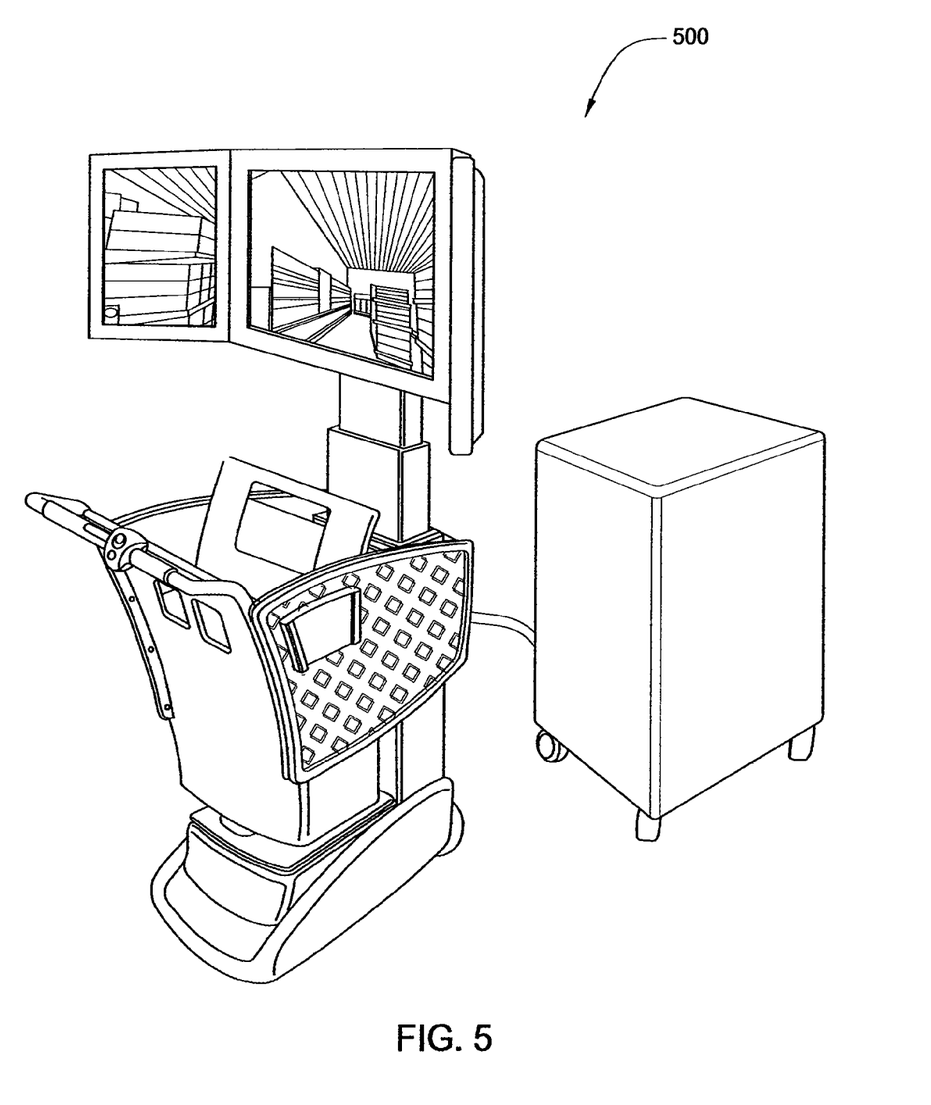
FIGS. 5 and 6 provide an isometric view of the example configurations of the apparatus first shown in FIGS. 2 and 3 for capturing test subject feedback, according to one embodiment of the invention.
Figure 6:
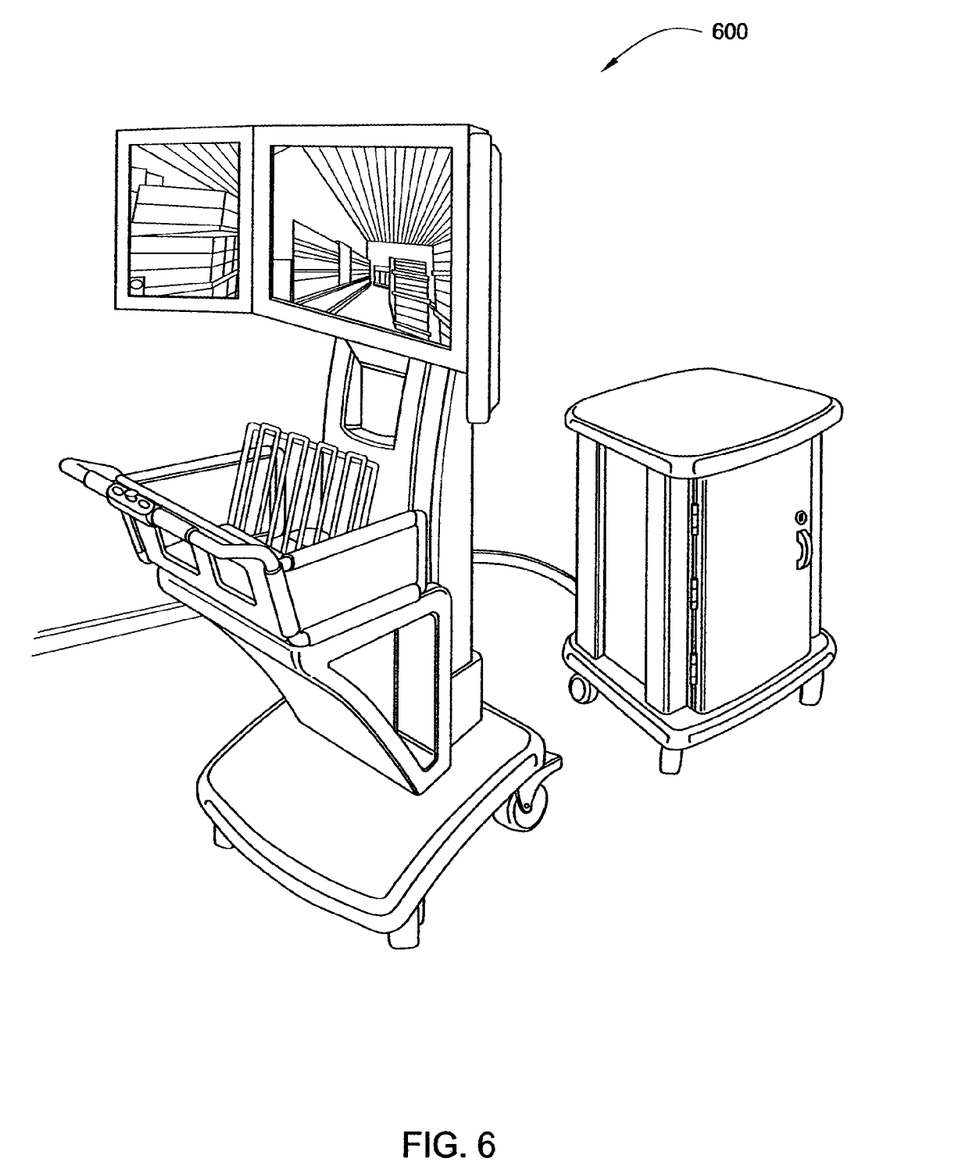

FIGS. 5 and 6 provide an isometric view of the example configurations of the apparatuses first shown in FIGS. 2 and 3, respectively, according to one embodiment of the invention. Apparatus 500 corresponds to the apparatus shown in FIG. 2 and apparatus 600 corresponds to the apparatus shown in FIG. 3. Illustratively, apparatus 500 and 600 provide an isometric view of a fully-assembled virtual reality station used for capturing test feedback, as described above.

Figure 7:
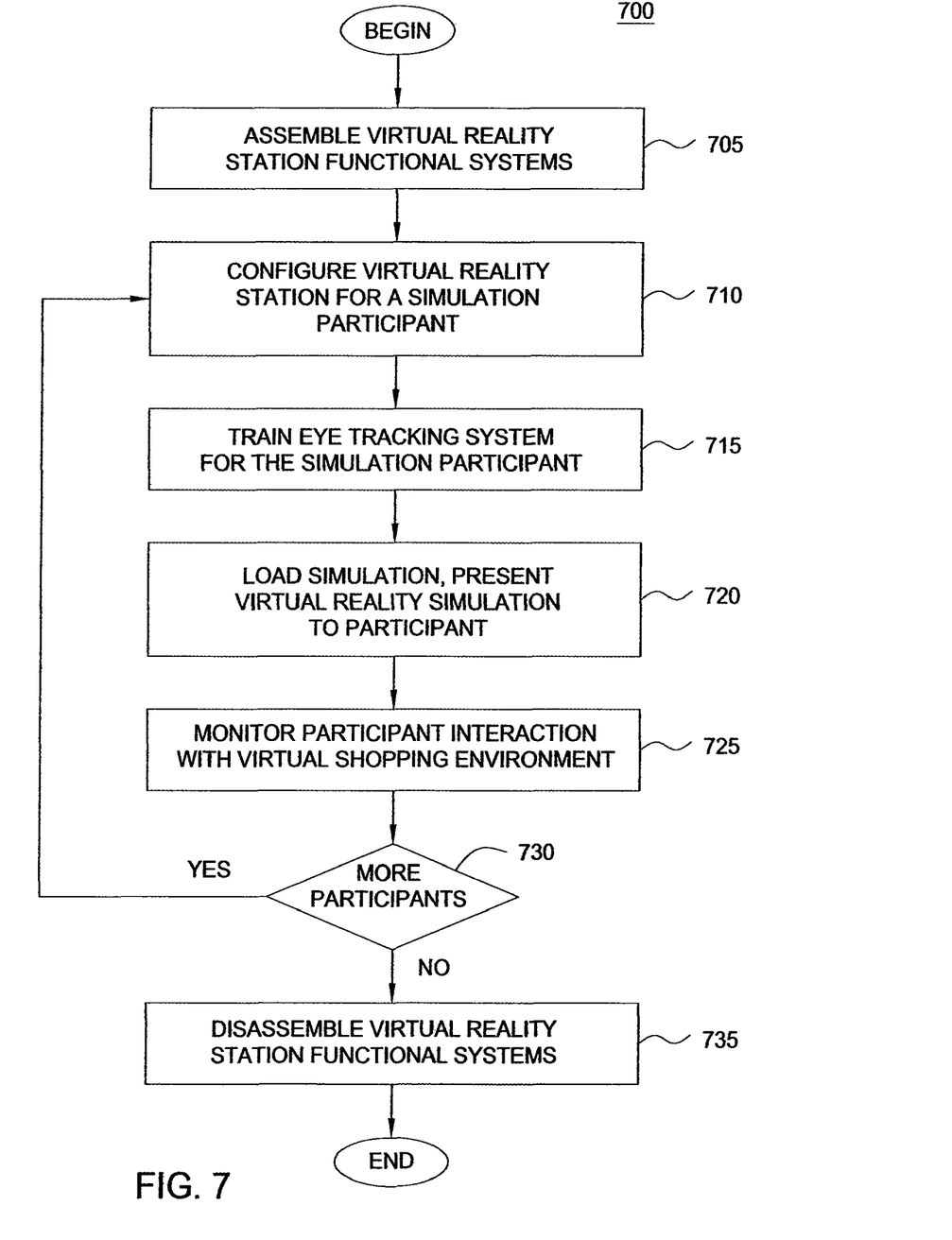
FIG. 7 is a flow chart illustrating a method for capturing test subject feedback using the apparatuses illustrated in FIGS. 1-6, according to one embodiment of the invention.

FIG. 7 is a flow chart illustrating a method 700 for capturing test subject feedback using the apparatuses illustrated in FIGS. 1-6, according to one embodiment of the invention. As shown, method 700 begins at step 705 where a system administrator assembles a virtual reality station from a plurality of functional systems. For example, FIGS. 2 and 3, described above, provide two example configurations of a support structure and connection system, a set of display screens, a computer system, a participant interface and simulation control system, and a participant monitoring system. Of course other configurations may be developed to suit the needs of a particular case.

At step 710 the assembled virtual reality station may be configured for use by a particular simulation participant. For example, the height of the display screens may be adjusted on the support structure so that the content of the simulation is displayed at an appropriate eye level for a given research participant. Similarly, at step 715, an eye tracking may be trained to recognize the eye movements of the participant. At step 720, a particular virtual reality simulation may be loaded in to the computer system and presented to the simulation participant. For example, as described above, multiple display screens may be used to provide the participant with a panoramic view of a simulated shopping environment.

At step 725, one or more monitoring systems (e.g., an eye tracking device and a simulation recorder) may monitor the stimulation participant interacting with the simulation presented using the virtual reality station. At step 730, the process of configuring the virtual reality station and presenting the simulation (steps 710-725) may be repeated for additional participants. For example, the simulation may be being presented to a group of simulation participants selected to share a common collection of demographic characteristics being researched. Alternatively, the simulation content may be modified for a participant multiple times, allowing different scenarios to be explored for a single participant. Once the use of the apparatus is complete, at step 735, the virtual reality station may be disassembled.

Embodiments of the invention are described above using an example directed to capturing feedback for use by supply chain entities. In these examples, the research participant is used to generate the feedback by interacting with the virtual reality environment. However, this feedback need not be generated with "dry runs." Instead, in another embodiment, the simulation participant may make actual purchasing decisions from within the virtual shopping environment. That is, the participant may actually be shopping in a given virtual reality session which terminates with the participant checking out at a virtual or real cashier and providing payment for their selected items. The shopping items may then be provided to the user at that time, or delivered to the user at a later time. Such an embodiment may actually produce superior feedback. Similarly, participants may be encouraged to participate in a given simulation through the use of various incentives. For example, a participant may be provided with a stipend used to purchase real products from within the virtual shopping environment. By allowing users to make real purchasing decisions within the virtual shopping environment, the quality of the research may be improved. Further, the shopping environment may be tailored to individual shoppers based on their preferences and feedback gathered during previous shopping experiences. Thus, each time the same participant returns to a given virtual store, the layout may differ slightly, based on the participant's prior buying and aisle browsing habits.

Advantageously, embodiments of the invention may be used to present a participant with a virtual reality simulation of a shopping environment. For example, the system of the present invention may be used to simulate the environment of a retail store where consumer goods are purchased. In one embodiment, a virtual reality station may include a number of functional systems that collectively provide an apparatus for capturing test subject feedback. The systems may include a participant interface and/or simulation control system, a support structure interconnection system, and a computer system configured to generate and present an immersive virtual reality environment on one or more display screens connected to the support structure. The virtual shopping environment may be configured to be responsive to user interaction. For example, the participant interface may allow the participant to navigate through the virtual shopping environment by using a joystick device fashioned to have the size, shape and appearance of a shopping cart. The systems may also include one or more participant monitoring systems used to capture feedback regarding the participants' interaction with the simulation.

While the foregoing is directed to embodiments of the present invention, other and further embodiments of the invention may be devised without departing from the basic scope thereof, and the scope thereof is determined by the claims that follow.

What is claimed is:

1. An apparatus for capturing test subject feedback from a virtual reality simulation of a shopping environment, comprising: one or more display screens configured to provide a panoramic view of the simulated shopping environment; a participant interface and control system configured to mimic at least a portion of a shopping cart, wherein the participant interface and control system includes a handle that senses an amount of pressure applied to the handle and navigates through the virtual reality simulation based on the pressure sensed, wherein the handle includes one or more buttons used to translate the view displayed on the one or more display screens through a predefined motion; a computer system configured to generate and present the virtual reality simulation to a simulation participant; one or more participant monitoring systems configured to monitor one or more physical responses of the simulation participant interacting with the virtual reality simulation; and a support structure and connection system connecting the one or more display screens, the participant interface and control system, the computer system, and the one or more participant monitoring systems.

2. The apparatus of claim 1, wherein the handle is connected to a mounting base and is used by the simulation participant to navigate through the virtual reality simulation.

3. The apparatus of claim 1, wherein the handle further includes a joystick device used to pan a view displayed on the one or more display screens up, down, or side to side.

4. The apparatus of claim 1, wherein the predefined motion simulates one of kneeling down or turning to present a left to right view of the virtual reality simulation.

5. The apparatus of any one of claims 1, 2, 3, and 4, wherein the one or more participant monitoring systems include at least an eye tracking system configured to track a position of the participant's gaze relative to the one or more display screens throughout the virtual reality simulation of the shopping environment.

6. The apparatus of claim 1, wherein the participant interface and control system includes one or more removable advertising panels.

7. The apparatus of claim 1, wherein at least one of the display screens is connected to the support structure, and wherein the height of the support structure may be adjusted based on the height of the simulation participant.

8. A system, comprising: a computing device; a memory storing a virtual reality program, wherein the virtual reality program is configured to generate a virtual shopping environment, wherein the virtual shopping environment corresponds to a real-world shopping environment; a virtual reality display platform, comprising: one or more display screens configured to present a participant with a panoramic view of the virtual shopping environment, a participant interface and control system configured to mimic at least a portion of a shopping cart, wherein the participant interface and control system includes a handle that senses an amount of pressure applied to the handle and navigates through the virtual shopping environment based on the pressure sensed, wherein the handle further includes one or more buttons used to translate the view displayed on the one or more display screens through a predefined motion, one or more participant monitoring systems configured to monitor one or more physical responses of a simulation participant interacting with the virtual shopping environment, and a support structure and connection system connecting the one or more display screens, the participant interface and control system, the computer system, and the one or more participant monitoring systems.

9. The system of claim 8, wherein the handle is connected to a mounting base and is used by the simulation participant to navigate through the virtual shopping environment.

10. The system of claim 8, wherein the handle further includes a joystick device used to pan a view of the virtual shopping environment displayed on the one or more display screens up, down, or from side to side.

11. The system of claim 8, wherein the predefined motion simulates one of kneeling down or turning to present a left or right view of the virtual shopping environment.

12. The system of any one of claims 8, 9, 10, and 11, wherein the one or more participant monitoring systems include at least an eye tracking system configured to track a position of the participant's gaze relative to the one or more display screens throughout the simulation of the virtual shopping environment.

13. The system of claim 8, wherein the participant interface and control system includes one or more removable advertising panels.

14. The system of claim 8, wherein at least one of the display screens is connected to the support structure, and wherein the height of the support structure may be adjusted based on the height of the simulation participant.

15. A method for capturing test subject feedback from a virtual reality simulation of a shopping environment, comprising: generating, by a computer system, a virtual reality simulation of a shopping environment to present to a simulation participant; and presenting the virtual reality simulation to the simulation participant on a virtual reality presentation platform, wherein the virtual reality presentation platform includes: one or more display screens configured to present a participant with a panoramic view of the virtual reality simulation, a participant interface and control system configured to mimic at least a portion of a size, shape and appearance of a shopping cart, wherein the participant interface and control system includes a handle that senses an amount of pressure applied to the handle and navigates through the virtual reality simulation based on the pressure sensed, wherein the handle further includes one or more buttons used to translate the view displayed on the one or more display screens through a predefined motion, one or more participant monitoring systems configured to monitor one or more physical responses of a simulation participant interacting with the virtual reality simulation, and a support structure and connection system connecting the one or more display screens, the participant interface and control system, the computer system, and the one or more participant monitoring systems.

16. The method of claim 15, wherein the handle is connected to a mounting base and is used by the simulation participant to navigate through the virtual reality simulation.

17. The method of claim 15, wherein the handle further includes a joystick device used to pan a view displayed on the one or more display screens up, down, or side to side.

18. The method of claim 15, wherein the predefined motion simulates one of kneeling down or turning to present a left or right view of the virtual reality simulation.

19. The method of any one of claims 15, 16, 17, and 18, wherein the one or more participant monitoring systems include at least an eye tracking system configured to track a position of the participant's gaze relative to the one or more display screens throughout the virtual reality simulation of the shopping environment.

20. The method of claim 15, wherein at least one of the display screens is connected to the support structure, and wherein the height of the support structure may be adjusted based on the height of the simulation participant.

* * * * *